UNITED STATES PATENT OFFICE.

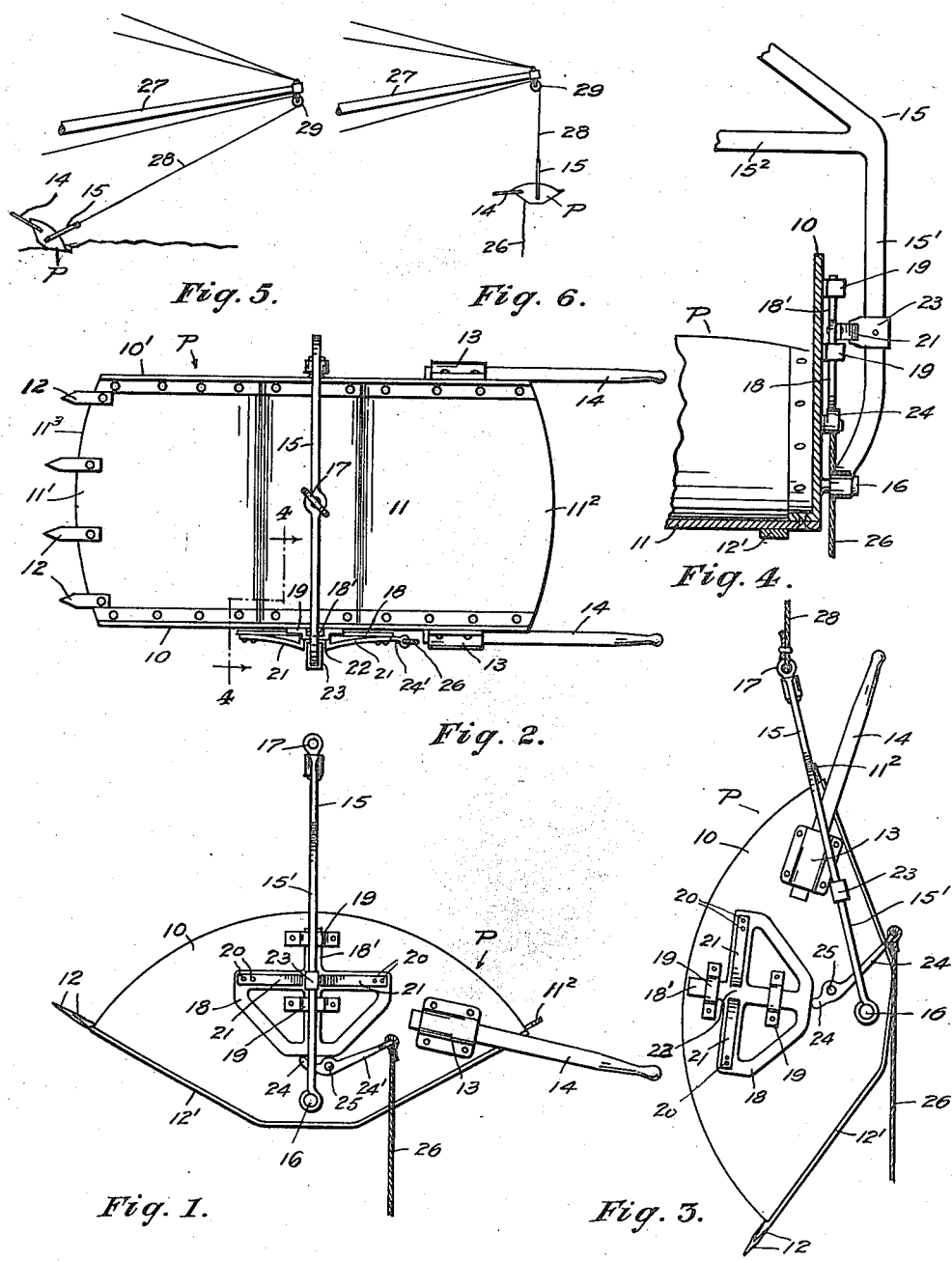

JOHN JOHNSON, OF TUKWILA, WASHINGTON, ASSIGNOR OF ONE-HALF TO THEODORE CARLSON, OF STILLWATER, WASHINGTON.

EXCAVATING AND HOISTING APPARATUS.

1,300,842.  Specification of Letters Patent.  Patented Apr. 15, 1919.

Application filed August 22, 1918. Serial No. 250,949.

*To all whom it may concern:*

Be it known that I, JOHN JOHNSON, a citizen of the United States, residing at Tukwila, in the county of King and State of Washington, have invented certain new and useful Improvements in Excavating and Hoisting Apparatus, of which the following is a specification.

This invention relates to excavating apparatus, and its object is to provide devices whereby the operations of digging, conveying and dumping material may be rapidly and efficiently performed.

The invention consists in the novel construction, adaptation and combination of parts, as will be hereinafter described and claimed.

In the accompanying drawings, Figure 1 is a side elevation of a dirt scraper embodying my invention. Fig. 2 is a plan view of the same. Fig. 3 is a view similar to Fig. 1 with the scraper pan in dumping position. Fig. 4 is a detail sectional view through 4—4 of Fig. 2. Figs. 5 and 6 are diagrammatic views illustrating the scraper in digging and hoisting positions.

The scraper comprises a pan P having sides 10 and $10^1$ extending upwardly from a curved or angular shaped bottom 11. Said bottom is made somewhat longer than said sides to afford protruding bottom portions $11^1$ and $11^2$ at the front and rear ends.

Extending forwardly of the cutting edge $11^3$ of the pan are teeth 12 which, by preference, are formed integral with longitudinal wearing strips $12^1$ secured to the underside of the bottom 11. Secured to the pan sides are sockets 13 for handles 14 by which the operator controls the scraper when being dragged forwardly in excavating.

15 represents a bail having its legs $15^1$ pivotally connected by bolts, such as 16, to the pan sides adjacent to the bottom and at about the midlength of the same. Said bail is provided with a transverse bar element $15^2$ disposed to be encountered by one of the protruding ends $11^1$ or $11^2$ to limit the tilting of the pan in dumping.

17 represents an eye-bolt swiveled in the bail 15 and to which the operating or power cable 28 (Figs. 3, 5 and 6) is attached.

18 is a frame of a substantially triangular shape having a central bar element $18^1$ extending through guides 19 secured to the pan side 10 to afford reciprocatory movements vertically of the pan when in its horizontal position, as shown in Fig. 1.

Secured to the outer ends of said frame, as by rivets 20, are horizontally arranged latches 21 constructed of resilient material and disposed as shown in Fig. 2 to provide a space 22 between their adjacent ends.

23 represents a block secured to the bail leg $15^1$ which is adjacent to the pan side 10 and located to project into the space between the latches when the latter are in their lowermost positions. The latches are elevated from engageable positions with respect to the bail block 23 by raising the frame 18 through the agency of the forwardly directed arm 24 of a lever which is fulcrumed at 25, and is actuated by means of a pull rope 26 connected to the rear arm $24^1$ of said lever.

As shown in Figs. 5 and 6, a boom 27 supports a pulley 29 over which passes the power cable 28 to any suitable winding mechanism, not shown.

The operation of my invention is as follows:

The pan is loaded by being drawn forward by means of the power cable 28 as represented in Fig. 5, the bail then being out of engagement with the latches 21. In such forward travel an attendant on the ground controls by means of handles 14 the action of the pan to suitably excavate material and cause the same to be delivered into the pan. When the pan is brought under the pulley 29 or is tilted up so that a pull is made on the cable 28 in a direction rectangular to the bottom of the pan, the bail will be brought into position to present the block 23 into the space 22 between the two latches 21. In such condition the pan is elevated by the power cable, as shown in Fig. 6, and the boom 27 swung to one side by any suitable or known means to carry the loaded pan into position for dumping.

The attendant thereupon, by means of the pull rope 26, influences the lever 24—$24^1$ to effect the raising of frame 18 to cause the latches thereon to be raised from their positions in which they serve to engage the bail block 23. When this is accomplished, the pan will tilt into the position in which it is shown in Fig. 3 to deposit the load.

From the foregoing it will be seen that the pan may be used for excavating and hoisting purposes through the instrumentality of a single power cable, and that the pan may be readily dumped while in an elevated position by means of a pull rope which regulates the latches, which latter acts automatically to reëngage the bail when the pan is suitably adjusted.

Under ordinary conditions the load will be disposed in the pan so that it has a tendency to tip forward; but the attendant by exerting a continued pull on the rope 26 may cause the pan to tip toward the rear.

What I claim, is—

A scraper pan consisting of side walls and a bottom, a bail pivotally connected to said side walls adjacent to the pan bottom, a frame connected for vertical reciprocatory movement to one of said walls, latches provided in spaced relations on said frame, means provided on said bail and engageable within the space between said latches, and a lever fulcrumed to the pan whereby said frame may be elevated to render said latches inoperable to retain the pan in upright position.

Signed at Seattle, Washington, this 10th day of August, 1918.

JOHN JOHNSON.

Witnesses:
PIERRE BARNES,
E. PETERSON.